Dec. 26, 1950      L. H. MORIN      2,535,506
AUTOMATIC LOCK SLIDER
Filed Aug. 9, 1947      2 Sheets-Sheet 1
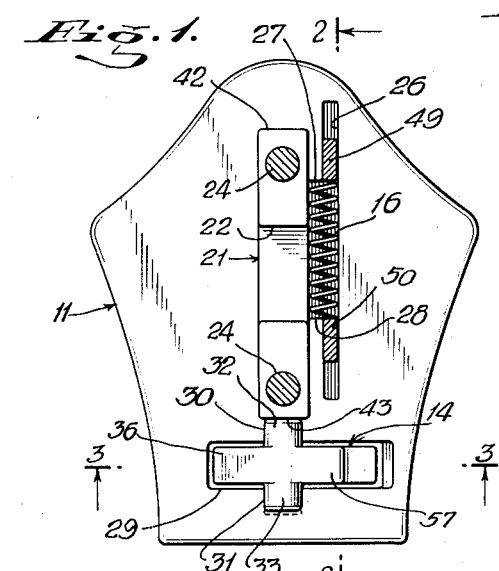
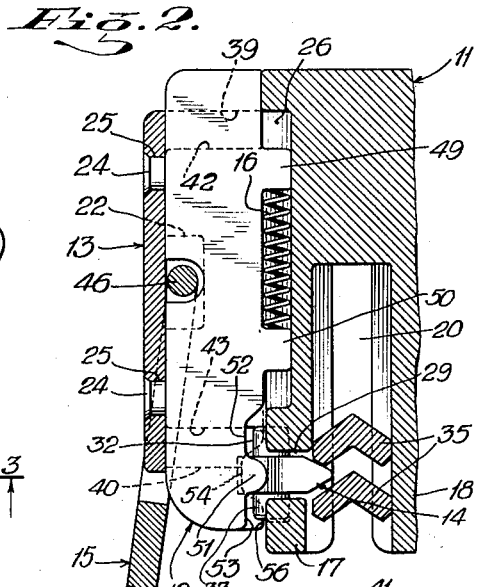
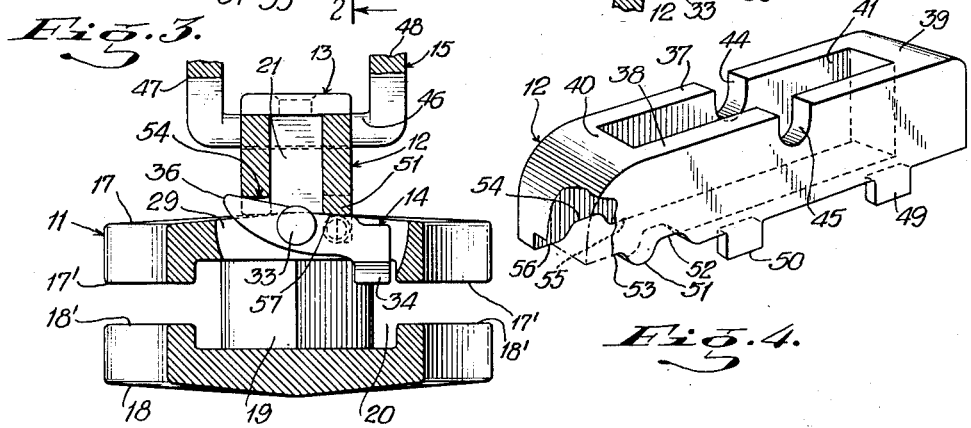
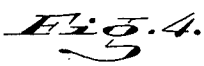
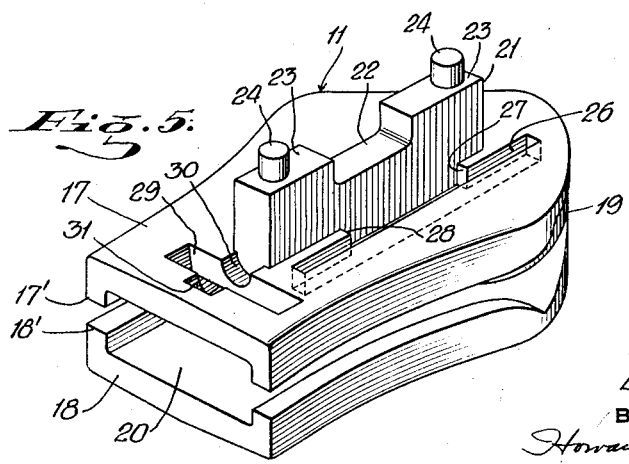
INVENTOR
LOUIS H. MORIN
BY
Howard Thompson
ATTORNEY Dec. 26, 1950   L. H. MORIN   2,535,506
AUTOMATIC LOCK SLIDER
Filed Aug. 9, 1947   2 Sheets-Sheet 2
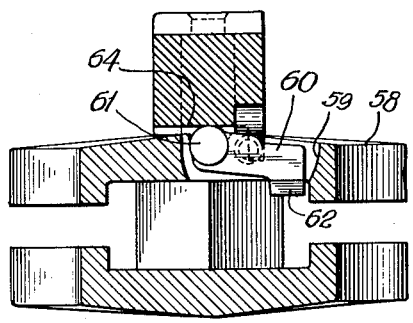
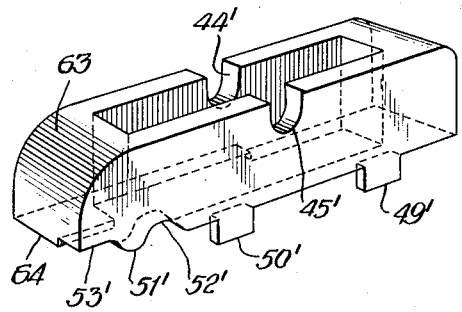
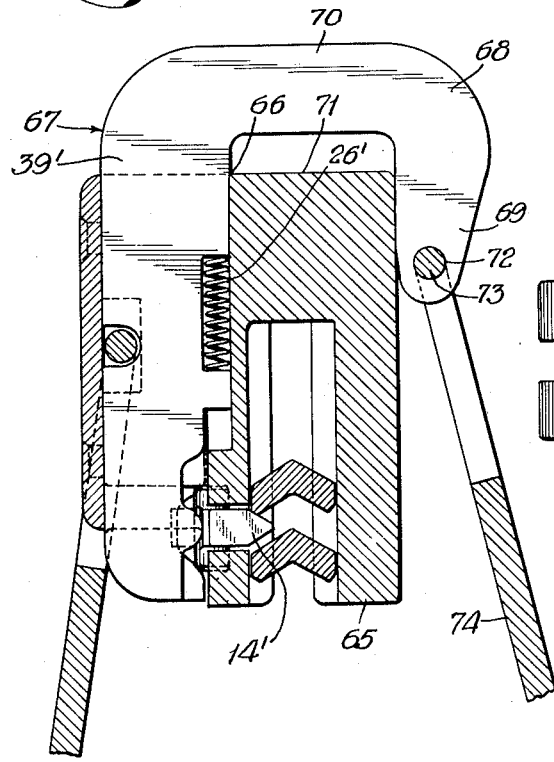
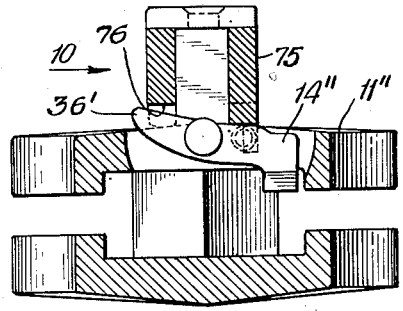
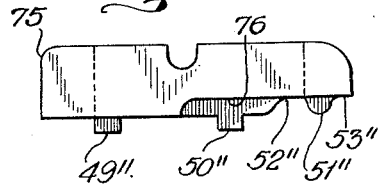
INVENTOR
LOUIS H. MORIN
BY
Howard E. Thompson
ATTORNEY

UNITED STATES PATENT OFFICE 2,535,506

AUTOMATIC LOCK SLIDER

Louis H. Morin, Bronx, N. Y.

Application August 9, 1947, Serial No. 767,815

20 Claims. (Cl. 24—205.14)

This invention relates to sliders employed on stringers to couple and uncouple the same. More particularly, the invention deals with sliders of the class described of the automatic locking type employing a lock element or pawl with means for positively retaining the lock element or pawl in operative position, and in certain embodiments of the invention to also retain the pawl or element in raised or inoperative position. Still more particularly, the invention deals with devices of the character described wherein all of the parts, with the exception of the spring employed, may be formed as die castings, thereby minimizing the cost of production, and the parts being further formed so as to permit simple assemblage of the parts.

The novel features of the invention will be best understood from the following description when taken together with the accompanying drawings, in which certain embodiments of the invention are disclosed, and in which the separate parts are designated by suitable reference characters in each of the views, and in which:

Fig. 1 is a plan view of a slider made according to my invention, omitting parts of the slider, and showing parts in section.

Fig. 2 is a section substantially on the line 2—2 of Fig. 1.

Fig. 3 is a section on the line 3—3 of Fig. 1, showing the lock element or pawl in elevation.

Fig. 4 is a perspective view of a sliding bail or pawl retaining member, with part of the construction broken away.

Fig. 5 is a perspective view of the slider body with the several parts detached.

Fig. 6 is a view similar to Fig. 3, omitting part of the construction, and showing a modification.

Fig. 7 is a view similar to Fig. 4, showing the bail or member of Fig. 6.

Fig. 8 is a view similar to Fig. 2, showing the complete slider and showing a modified form of bail or member.

Fig. 9 is a view similar to Figs. 3 and 6, showing another modification; and

Fig. 10 is a side view of the bail or member shown in Fig. 9, looking in the direction of the arrow 10 of Fig. 9.

My improved slider construction is preferably formed from several die cast parts, all of which are formed in a simple casting operation and without undercuts which would otherwise require special forming operations. Furthermore, the parts are so constructed as to facilitate assemblage of the parts in a one directional movement thereby simplifying the assemblage operation and dispensing with the use of special fixtures which might otherwise be required. Furthermore, the pivot end of the pull may be formed as a solid integral pivot portion giving strength and rigidity thereto. Still further, the assemblage is so constructed as to substantially shield and protect the spring employed for retaining the sliding bail or member in its normal locked position.

In one adaptation of the invention, the sliding bail or member includes means to also retain the locked pawl or element in raised inoperative position, thereby preventing ratcheting of the same over the stringer scoops in movement of the slider along the stringers.

In Figs. 1 to 5 inclusive, I have shown one adaptation of my invention, which comprises five die cast parts, namely a slider body part member 11, the bail part 12, the top plate part 13, the pawl part 14 and the pull part 15. To these parts is added an elongated coil spring 16 in completing the parts of the complete automatic lock slider assemblage.

The slider body 11 comprises top and bottom walls 17 and 18 joined and spaced at the wide end of the slider in a connecting web or frog 19, the walls 17 and 18 having inturned side flanges, as at 17' and 18', note Fig. 3. These flanges in conjunction with the walls, form the channel 20 of the slider body. The top wall 17 has centrally and longitudinally thereof a raised elongated bar or rib 21, having a central elongated pivot recess 22 at the ends of which are raised seats 23 having upwardly projecting rivet pins 24, note Fig. 5. The plate 13 has countersunk apertures, as at 25, to receive the rivet pins 24 which are headed over in securing the plate to the bar or rib 21, as will be apparent from a consideration of Fig. 2 of the drawing.

At one side of the bar or rib 21, the wall 17 has an elongated recess 26 which is enlarged centrally to form shoulders or abutments 27 and 28 against which the ends of the spring 16 seat, as will clearly appear in Fig. 1 of the drawing. The wall 17 has forwardly of the bar or rib 21, and in spaced relation thereto, a transverse aperture 29 which opens into the channel 20 of the slider and centrally of this aperture the top wall 17 has semi-circular recesses or bearing portions 30—31. The recesses or bearing portions 30—31 are adapted to receive and support pivot pin ends 32—33 respectively, on the lock element or pawl 14. This element or pawl is arranged in the aperture 29 and swings on the pivot pin ends in said aperture in movement of the V-shaped lock end 34 into and out of the channel 20 of the slider, or in other words, into and out of engagement with stringer scoops, as indicated in Fig. 2 of the drawing, where two stringer scoops are diagrammatically shown in section at 35. The element 14 has at the other side of the pivot pins 32—33, an extending finger 36, by means of which the pawl may be moved into raised position, as later described.

The bail or sliding member 12 comprises an elongated O-shaped device comprising side walls 37—38 and end walls 39 and 40. Within these walls is the vertically disposed aperture or opening 41 adapted to receive the bar or rib 21 and in the normally locked position of the member 12, the ends 42 and 43 of the rib are in spaced relation to the walls 39 and 40, as will clearly appear from a consideration of Fig. 2 of the drawing. This provides for a free sliding movement of the member 12 in both directions against the action of the spring 16.

The side walls 37 and 38 have pivot recesses 44 and 45 centrally thereof for reception of the cross head or pivot end 46 of the pull 15. It will here be noted that the pin end 46 is of a solid integral construction joining side portions 47 and 48 of the pull, thus giving strength and rigidity to the pull structure. The side wall 38 of the member 12 has two downwardly extending lugs or tails 49 and 50 which extend into and operate in the recess 26, as will clearly appear in Fig. 1 of the drawing. In this figure, the lugs or tails 49 and 50 are shown in section in order to clearly illustrate their relationship with respect to the shoulders 27 and 28. In other words, the spring 16 maintains the member 12 in the neutral position shown and with inner adjacent surfaces of the lugs 49 and 50 in alinement with said shoulders. This is the pawl locking position of the member 12, as clearly seen in Fig. 2 of the drawing.

The side wall 38, forwardly of the lug 50, is cutout to form a rounded camming pawl retaining portion or shelf 51, at opposite sides of which are recesses 52 and 53. The wall 37 in transverse alinement with respect to the portion 51, has a recess 54, whereas the lower surfaces of the wall 37 beyond the end limits of the recess 54 form pawl engaging and supporting shelves, as at 55 and 56. In other words, when the pawl 14 is held down in its locked position by the shelf 51, the finger 36 of the pawl extends upwardly in the recess 54. However, in moving the member 12 forwardly, or in a downward direction, as seen in Fig. 2, the shelf 55 will engage the finger 36 and move the same inwardly in the operation of raising the lock end 34 of the pawl out of the channel 20. In this latter operation, the pawl rises in the recess 52. In movement of the member 12 in the opposite direction, or upwardly in Fig. 2, the pawl rises in the recess 53 and is depressed by the shelf 56. When either of the aforesaid manual movements of the member 12 is released, the spring 16 automatically will return the member 12 to its neutral position, as in Fig. 2, again moving the pawl into and holding the same in locked position.

In the normal position of the parts, as illustrated in Fig. 2 of the drawing, the plate 13 is of sufficient length to extend between the walls 39 and 40 and cover the opening 41 therein. The plate 13 also forms a guide for the member 12 and means retaining the pivot end 46 of the pull against displacement from the parts 11 and 12. The recess 22 is of sufficient length to allow the member 12 to move its fullest extent in both directions by the pull in moving the lock element or pawl 14 into raised inoperative position. It will be apparent from a consideration of Fig. 3 of the drawing that the cam portion or shelf 51 operates upon a shoulder 57 on the upper surface of the pawl or element 14.

In assemblage of the parts, the spring 16 is first placed in the recess 26 between the shoulders 27 and 28, then the pawl 14 is placed in position in the recesses or bearings 30—31, after which the member 12 is placed in position. The pull is then mounted in the recesses 44—45 and the recesses 22, after which the plate 13 is attached, and the rivet pins 24 are headed over in securing the parts in assembled relationship to each other. The plate 13 seats upon the raised portions 23 in this operation, allowing sufficient clearance for free operation of the member 12. As these clearances are slight, no attempt is made to show the clearances in the accompanying drawing.

In Figs. 6 and 7 of the drawing, I have shown a slight modification. In these figures, 58 represents a slider generally of the construction shown in Figs. 1 to 5 inclusive and modified only to the extent that an aperture 59 is provided which differs from the aperture 29 in that it extends primarily to one side of the slider wall to accommodate a lock pawl or element 60, which again differs from the element 14 in having the finger or tail 36 removed. The pivot portion as at 61 will be the same as the pivot portion of the pawl 14 and the lock end 62 the same as the lock end 34. In the structure of Figs. 6 and 7, the bail or sliding member 63 differs from the member 12 in providing a flat surface 64 at one side thereof and dispensing with the recess 54 which was provided to clear the finger 36. Otherwise the member 63 has the same elements and parts and to illustrate some of the structures, the references as applied to Figs. 1 to 5 inclusive will be simply primed, for example, 44'—45' are the pull pivot recesses, 49'—50' are the downwardly extended lugs, 51' the shelf and 52'—53' the recesses.

The primary difference of the structure shown in Figs. 6 and 7 over that shown in Figs. 1 to 5, is in the fact that no means is provided to definitely raise the pawl 60 into inoperative position and to hold the same in such position. When the member 63 is operated to release the pawl, the pawl becomes a free element adapted to ratchet freely over the scoops of the stringer in movement in either of the recesses 52'—53'.

In Fig. 8, I have shown a slight modification of the structure illustrated in Figs. 1 to 5 inclusive. In this figure, a slider body 65 is employed, which differs from the slider body 11 simply in extending the recess 26', similar to the recess 26, outwardly through the end of the slider body, as seen at 66. With this construction, a member 67, generally similar to the member 12 is employed, being modified only to the extent that the rear wall 39' thereof has an integral projecting L-shaped portion 68 comprising an end 69 substantially paralleling the main part of the member 67 and a cross head end 70 extending over the wide end of the slider body. The member 70 is spaced with respect to the end 71 of the slider body sufficiently to permit downward movement of the member 67, as seen in Fig. 8 in one operation thereof to move the pawl or lock element 14' into inoperative position. The end 69 of the member 67 is apertured, as seen at 72 to receive the pivot end 73 of a secondary pull 74. It will thus be apparent that the slider of Fig. 8 is adapted for use on fasteners where pulls are required at both sides of the slider, such for example, where stringers are employed on tents and similar supports. In that the structure of Fig. 8 is otherwise identical to the structure shown in Figs. 1 to 5 inclusive, no further specific description thereof will be given.

In Figs. 9 and 10 I have shown another slight modification of the structure illustrated in Figs. 1 to 5 inclusive, and in Fig. 9, the slider 11'' is identical with the slider 11 of the earlier figures, the pawl 14'' is identical with the pawl 14. The only difference resides in the structure of the member 75, which differs from the member 12 in dispensing with the shelf portions 55 and 56. In other words, the member 75 has one elongated recess 76 for clearance of the finger end 36' of the pawl 14'', leaving the pawl 14'' free to ratchet over the stringer scoops when the pawl is released from its locked position, as will be apparent.

In Fig. 10 of the drawing I have shown on the member 75 the lugs 49''—50'', similar to the lugs 49—50, the cam portion or shaft 51'' and the recesses 52''—53'' similar to the recesses 52—53. In all other phases, the member 75 is of the same structure as the member 12, thus no further description thereof is deemed to be necessary.

From the foregoing it will be apparent that in the structure shown in Figs. 6 to 10 inclusive, the pawl becomes a free ratcheting element when released from its locked engagement. Whereas in Figs. 1 to 5 inclusive, when the pawl is released from its locked engagement, it is positively held in raised position to prevent ratcheting. In all forms of construction, the sliding bail or member is normally held in its locked position by the spring employed and is returned to this position by the spring when the pull is released.

Having fully described my invention, what I claim as new and desire to secure by Letters Patent is:

1. In sliders for separable fastener stringers, a channelled slider body having spaced walls, a lock pawl arranged transversely of one wall of the body and pivoted for movement into and out of the channel thereof, a member mounted for sliding movement longitudinally of said wall of the body, said member having a part engaging the pawl to retain the pawl in locked position extending into the channel of said body, a coil spring mounted on said wall of the slider body engaging said member and normally maintaining said member in pawl locking position, a pull for moving said member longitudinally of the slider in both directions against the action of said spring, and said member having cutout portions releasing the pawl for movement into inoperative position in movement of said member in either direction on said slider.

2. In sliders for separable fastener stringers, a channelled slider body having spaced walls, a lock pawl arranged transversely of one wall of the body and pivoted for movement into and out of the channel thereof, a member mounted for sliding movement longitudinally of said wall of the body, said member having a part engaging the pawl to retain the pawl in locked position extending into the channel of said body, a coil spring mounted on said wall of the slider body engaging said member and normally maintaining said member in pawl locking position, a pull for moving said member longitudinally of the slider in both directions against the action of said spring, said member having cutout portions releasing the pawl for movement into inoperative position in movement of said member in either direction on said slider, and said member having means engaging the pawl to move the pawl into raised inoperative position and to support the same in such position.

3. In sliders for separable fasteners stringers, a channelled slider body having spaced walls, a lock pawl arranged transversely of one wall of the body and pivoted for movement into and out of the channel thereof, a member mounted for sliding movement longitudinally of said wall of the body, said member having a part engaging the pawl to retain the pawl in locked position extending into the channel of said body, a coil spring mounted on said wall of the slider body engaging said member and normally maintaining said member in pawl locking position, a pull for moving said member longitudinally of the slider in both directions against the action of said spring, said member having cutout portions releasing the pawl for movement into inoperative position in movement of said member in either direction on said slider, said member having means engaging the pawl to move the pawl into raised inoperative position and to support the same in such position, said member having an integral portion extending onto the other wall of the slider, and another pull pivoted to said last named portion.

4. In sliders for separable fastener stringers, a channelled slider body having spaced walls, a lock pawl arranged transversely of one wall of the body and pivoted for movement into and out of the channel thereof, a member mounted for sliding movement longitudinally of said wall of the body, said member having a part engaging the pawl to retain the pawl in locked position extending into the channel of said body, a coil spring mounted on said wall of the slider body engaging said member and normally maintaining said member in pawl locking position, a pull for moving said member longitudinally of the slider in both directions against the action of said spring, said member having cutout portions releasing the pawl for movement into inoperative position in movement of said member in either direction on said slider, said member having a part extending onto the other wall of the slider, and a pull pivoted to said last named part.

5. In sliders for separable fastener stringers, a channelled slider body having spaced walls, a lock pawl arranged transversely of one wall of the body and pivoted for movement into and out of the channel thereof, a member mounted for sliding movement longitudinally of said wall of the body, said member having a part engaging the pawl to retain the pawl in locked position extending into the channel of said body, a coil spring mounted on said wall of the slider body engaging said member and normally maintaining said member in pawl locking position, a pull for moving said member longitudinally of the slider in both directions against the action of said spring, said member having cutout portions releasing the pawl for movement into inoperative position in movement of said member in either direction on said slider, said pawl having a projecting finger, and said member having a cutout portion receiving the finger of the pawl when said pawl is in locked position.

6. In sliders for separable fastener stringers, a channelled slider body having spaced walls, a lock pawl arranged transversely of one wall of the body and pivoted for movement into and out of the channel thereof, a member mounted for sliding movement longitudinally of said wall of the body, said member having a part engaging the pawl to retain the pawl in locked position extending into the channel of said body, a coil spring mounted on said wall of the slider body engaging said member and normally maintaining said member in pawl locking position, a pull for moving said member longitudinally of the slider in both directions against the action of said spring, said member having cutout portions releasing the pawl for movement into inoperative position in movement of said member in either direction on said slider, said pawl having a projecting finger, and said member having a cutout portion receiving the finger of the pawl when said pawl is in locked position and clearing the finger in movement of the member longitudinally of the slider in both directions.

7. A lock slider for separable fastener stringers, said slider comprising a pair of flanged walls spaced and joined by a connecting web, one wall of the slider having an elongated rib extending centrally and longitudinally of the outer surface of said wall, said wall at one end of the rib having a transversely elongated aperture, said wall at one side of the rib having an elongated recess, shoulder portions in said recess inwardly of terminal ends thereof, an O-type member defined by side and end walls mounted on said rib for movement longitudinally thereof and of said slider wall, one side wall of said member having spaced lugs extending downwardly into said recess, inner opposed surfaces of the lugs being spaced apart a distance common to the spacing of said shoulders, a coil spring mounted in the recess of said wall and bearing on said shoulders and said inner opposed surfaces of the lugs, normally maintaining said member with the lugs in alinement with said shoulders and with end walls of said member spaced with respect to the ends of said rib thereby providing movement of said member in both directions longitudinally of the rib, a lock pawl pivoted to said wall of the slider and arranged in said aperture to move into and out of the channel of the slider, said member having a part engaging the pawl, in the normal position of said member, to retain the pawl in locked position, means retaining the member against displacement from said wall, and said member having recesses at opposite sides of said part permitting movement of the pawl into raised inoperative position in movement of said member in either direction on the slider.

8. A lock slider for separable fastener stringers, said slider comprising a pair of flanged walls spaced and joined by a connecting web, one wall of the slider having an elongated rib extending centrally and longitudinally of the outer surface of said wall, said wall at one end of the rib having a transversely elongated aperture, said wall at one side of the rib having an elongated recess, shoulder portions in said recess inwardly of terminal ends thereof, an O-type member defined by side and end walls mounted on said rib for movement longitudinally thereof and of said slider wall, one side wall of said member having spaced lugs extending downwardly into said recess, inner opposed surfaces of the lugs being spaced apart a distance common to the spacing of said shoulders, a coil spring mounted in the recess of said wall and bearing on said shoulders and said inner opposed surfaces of the lugs, normally maintaining said member with the lugs in alinement with said shoulders and with end walls of said member spaced with respect to the ends of said rib thereby providing movement of said member in both directions longitudinally of the rib, a lock pawl pivoted to said wall of the slider and arranged in said aperture to move into and out of the channel of the slider, said member having a part engaging the pawl, in the normal position of said member, to retain the pawl in locked position, means retaining the member against displacement from said wall, said member having recesses at opposite sides of said part permitting movement of the pawl into raised inoperative position in movement of said member in either direction on the slider, and a pull pivotally coupled with said member.

9. A lock slider for separable fastener stringers, said slider comprising a pair of flanged walls spaced and joined by a connecting web, one wall of the slider having an elongated rib extending centrally and longitudinally of the outer surface of said wall, said wall at one end of the rib having a transversely elongated aperture, said wall at one side of the rib having an elongated recess, shoulder portions in said recess inwardly of terminal ends thereof, an O-type member defined by side and end walls mounted on said rib for movement longitudinally thereof and of said slider wall, one side wall of said member having spaced lugs extending downwardly into said recess, inner opposed surfaces of the lugs being spaced apart a distance common to the spacing of said shoulders, a coil spring mounted in the recess of said wall and bearing on said shoulders and said inner opposed surfaces of the lugs, normally maintaining said member with the lugs in alinement with said shoulders and with end walls of said member spaced with respect to the ends of said rib thereby providing movement of said member in both directions longitudinally of the rib, a lock pawl pivoted to said wall of the slider and arranged in said aperture to move into and out of the channel of the slider, said member having a part engaging the pawl, in the normal position of said member, to retain the pawl in locked position, means retaining the member against displacement from said wall, said member having recesses at opposite sides of said part permitting movement of the pawl into raised inoperative position in movement of said member in either direction on the slider, a pull pivotally coupled with said member, and said member and pawl having interengaging means for moving the pawl into and holding the pawl in raised position.

10. In automatic lock sliders for separable fastener stringers, a lock element pivotally mounted at one end portion of a slider body to swing vertically in a plane transversely of said body, a member mounted to move longitudinally of the slider body and at right angles to the swinging movement of said lock element, said member having a part engaging and holding the lock element in locked position, tensional means normally supporting said member in said lock element locking position, and a pull for moving said member from the normal position in either direction on said slider against the action of said tensional means in disengaging said part from the lock element to permit movement of the lock element into raised inoperative position.

11. In automatic lock sliders for separable fastener stringers, a lock element pivotally mounted at one end portion of a slider body to swing vertically in a plane transversely of said body, a member mounted to move longitudinally of the slider body and at right angles to the swinging movement of said lock element, said member having a part engaging and holding the lock element in locked position, tensional means normally supporting said member in said lock element locking position, a pull for moving said member from the normal position in either direction on said slider against the action of said tensional means in disengaging said part from the lock element to permit movement of the lock element into raised inoperative position, and interengaging means on said lock element and member for moving the lock element into and holding the same in raised position.

12. In automatic lock sliders for separable fastener stringers, a lock element pivotally mounted at one end portion of a slider body to swing vertically in a plane transversely of said body, a member mounted to move longitudinally of the slider body and at right angles to the swinging movement of said lock element, said member having a part engaging and holding the lock element in locked position, tensional means normally supporting said member in said lock element locking position, a pull for moving said member from the normal position in either direction on said slider against the action of said tensional means in disengaging said part from the lock element to permit movement of the lock element into raised inoperative position, said member being mounted on one wall of the slider, said member having a part extending onto the opposed wall of the slider, and a pull pivoted to said last named part.

13. In automatic lock sliders for separable fastener stringers, a lock element pivotally mounted at one end portion of a slider body to swing vertically in a plane transversely of said body, a member mounted to move longitudinally of the slider body and at right angles to the swinging movement of said lock element, said member having a part engaging and holding the lock element in locked position, tensional means normally supporting said member in said lock element locking position, a pull for moving said member from the normal position in either direction on said slider against the action of said tensional means in disengaging said part from the lock element to permit movement of the locking element into raised inoperative position, and said lock element having free swinging movement on the slider when released by said part of said member.

14. In sliders employing a transversely arranged lock pawl on one wall thereof for swinging movement into operative and inoperative positions, a member mounted for sliding movement on said wall of the slider cooperating with and controlling movement of said pawl, said member comprising an elongated unitary body defined by side and end walls, one side wall having a pair of longitudinally spaced and projecting lugs on the lower surface thereof, said wall adjacent one end of said body having cutout portions divided and spaced by a rounded pawl engaging part, and said side walls having centrally thereof alined recesses forming a pivotal support for a pull for actuating the member on the slider.

15. In sliders employing a transversely arranged lock pawl on one wall thereof for swinging movement into operative and inoperative positions, a member mounted for sliding movement on said wall of the slider cooperating with and controlling movement of said pawl, said member comprising an elongated unitary body defined by side and end walls, one side wall having a pair of longitudinally spaced and projecting lugs on the lower surface thereof, said wall adjacent one end of said body having cutout portions divided and spaced by a rounded pawl engaging part, said side walls having centrally thereof alined recesses forming a pivotal support for a pull for actuating the member on the slider, and the other side wall of said body in transverse alinement with said pawl locking part having a recess.

16. In automatic lock sliders of the class described, a slider body comprising top and bottom flanged walls joined and spaced at one end by a connecting web, the top wall of the slider having centrally and longitudinally thereof an elongated rib, said wall of the slider at one end of the rib having a transverse aperture opening into the channel of said slider body, said wall of the slider at one side of the rib having a longitudinally extending recess, the recess including shoulder portions inwardly of terminal ends of the recess, said wall of the slider body in alinement with the rib and extending into the aperture in said wall having pivot pin bearing sockets for pivotal mounting of a lock pawl in connection with the slider body, said rib being recessed centrally of the outer surface thereof forming alined platform ends, and said platform ends having outwardly projecting rivet pin portions.

17. In a channelled fastener slider of the kind including a lock piece movable relatively to the slider into and out of channel-blocking position, the combination of a lock piece actuator mounted on the slider for lengthwise sliding movement relatively thereto, stop means for limiting the travel of the actuator, spring means engaged with the slider and engaging the actuator and biasing the latter to a mid-position with respect to its travel limits, the actuator having a cam portion engageable with the lock piece for moving the same into its said channel-blocking position, said cam portion being dimensioned and located to overlie the lock piece in the said mid-position of the actuator and to clear the lock piece in both of the limit positions of travel of the actuator.

18. In a channelled fastener slider of the kind including a lock piece movable relatively to the slider into and out of channel-blocking position, the combination of a lock piece actuator mounted on the slider for lengthwise sliding movement relatively thereto, stop means for limiting the travel of the actuator, spring means engaged with the slider and engaging the actuator and biasing the latter to a mid-position with respect to its travel limits, the actuator having a portion dimensioned and located to overlie the lock piece in the said mid-position of the actuator and to clear the lock piece in both of the limit positions of travel of the actuator.

19. In a channelled fastener slider of the kind including a lock piece movable relatively to the slider into and out of channel-blocking position, the combination of a lock piece actuator mounted on the slider for lengthwise sliding movement relatively thereto, stop means for limiting the travel of the actuator, spring means engaged with the slider and engaging the actuator and biasing the latter to a mid-position with respect to its travel limits, the actuator having a cam portion engageable with the lock piece for moving the same into its said channel-blocking position, said cam portion being dimensioned and located adjacent the lock piece and in obstructing relation thereto, in the said mid-position of the actuator, and the actuator incorporating a recess adjacent the cam portion located and dimensioned to accommodate a portion of the lock piece in a limit position of travel of the actuator.

20. In a channelled fastener slider of the kind including a lock piece movable relatively to the slider into and out of channel-blocking position, the combination of a lock piece actuator mounted on the slider for lengthwise sliding movement relatively thereto, stop means for limiting the travel of the actuator, spring means engaged with the slider and engaging the actuator and biasing the latter to a mid-position with respect to its travel limits, the actuator having a portion engageable with the lock piece to move the latter into channel-blocking position, and a pull for moving the actuator.

LOUIS H. MORIN.

REFERENCES CITED

The following references are of record in the file of this patent:

UNITED STATES PATENTS

| Number | Name | Date |
|---|---|---|
| 2,083,919 | Norton | June 15, 1937 |